INVENTOR.
Robert G. Klimo

3,500,375
DIGITAL OVERSPEED DETECTOR
Robert G. Klimo, Parma, Ohio, assignor to TRW, Inc., Cleveland, Ohio, a corporation of Ohio
Filed Feb. 21, 1967, Ser. No. 617,683
Int. Cl. G08b 21/00
U.S. Cl. 340—268    11 Claims

ABSTRACT OF THE DISCLOSURE

An overspeed digital detection device having signal means for generating a fixed number of pulses per revolution of a toothed wheel being speed detected and having counting means for counting a number of pulses generated by the signal means. A timing means begins clocking a time interval and the timing means and the counting means, running side by side, generate output pulses at the end, respectively, of the count and of the timing intervals. If the output pulse from the counting means occurs prior in time to the output pulse from the timing means, an "and" gate is triggered to initiate an alarm signal indicating that the speed of the toothed wheel has exceeded a preset minimum. The speed being detected can be varied either by changing the count of the counting means or by varying the time interval of the timing means.

BACKGROUND OF THE INVENTION

Field of the invention

The field of art to which this invention pertains is a speed detection device, and in particular to a digital detecting device which accurately detects the speed of a rotating object and which automatically actuates an alarm when the speed so detected exceeds a given value as determined by an electronic time generating system.

Summary

An important feature of the present invention is the provision of a means for accurately detecting the displacement of a rotating object, for accurately comparing the displacement of an object with the time passed during that displacement and to actuate an alarm when more than the specified degree of displacement occurs in a predetermined unit of time.

Another feature of this invention is the provision of a multi-stage counting system for counting the displacement of a rotating object and of a time generating system which is capable of resetting the multi-stage counter when a given time interval elapses prior to the counting of a given displacement of the rotating object being speed detected.

An object of the present invention is to provide an accurate means for sensing the speed of a rotating object and for actuating an alarm when the speed of that object exceeds a preset maximum and to avoid actuating an alarm by the use of an automatic timing system when the speed of the object is below the maximum value.

Another object of the present invention is to provide a means for generating a series of pulses which reflect the displacement of an object and for using those pulses to trigger a time generator and to simultaneously trigger a counting system and to provide a means for generating a response signal when the count of the counting system is exhausted prior to the elapse of a preset time interval.

It is an additional object of this invention to provide an electronic means for sensing the displacement of a rotating wheel and to provide a repetitive time sequencing system for comparison with the displacement being measured wherein the time sequencing system generates an output pulse for resetting the displacement measuring system and for substantially simultaneously resetting the time sequencing system.

It is a further object of this invention to provide a means for sensing the displacement of a rotating object and for generating a series of output pulses therein. The output pulses are connected to the input of a second transistor of a bistable circuit thereby turning the second transistor "off" and allowing a unijunction firing circuit to build up a charge over a specified time interval, and wherein the discharge of the unijunction charging circuit is coupled to a first transistor for turning that transistor "off" and turning the second transistor "on," thereby generating an output pulse which is used to reset a series of counters which counts the number of pulses generated by the sensing means.

These and other objects and advantages of this invention will be apparent to those skilled in the art from the following description and the associated drawings which are a part hereof.

Description of the preferred embodiment

Figure 1:
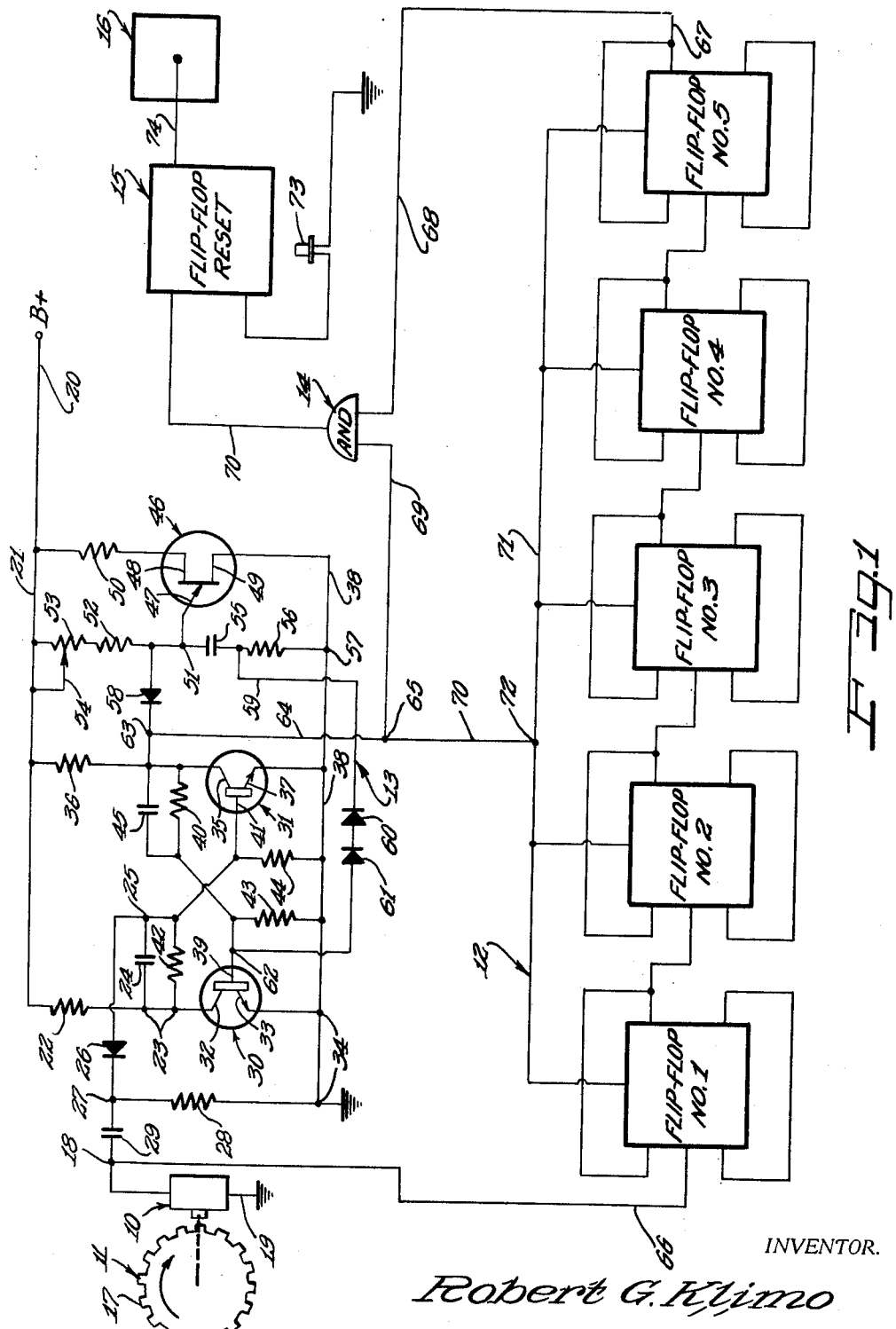
FIGURE 1 is a partial block diagram and a partial schematic diagram of the overspeed detection system of this invention wherein the blocks illustrated thereon are representative of circuits which are common to those skilled in the art and which require no further description.

The overspeed detection system of this invention comprises generally a means 10 for generating a series of pulses in response to the displacement of a wheel 11, a counting stage 12 to count the pulses generated by the means 10, a timing stage 13 to set up a comparison time interval, an "and" gate 14 for generating an output pulse when the counting sequence of the counter 12 precedes the expiration of a time interval determined by the timer 13. The output of the "and" gate 14 is then used to operate a flip-flop 15 which in turn actuates an alarm 16.

The wheel 11 which represents a rotatable member being speed detected has a plurality of teeth or sprockets 17 mounted uniformly about the periphery thereof. The detection means 10 may comprise a pick-up coil, as is well understood, and the rotation of the wheel 11 causes the sprockets or teeth 17 to pass adjacent to the pick-up coil to effectively vary the impedance between a point 18 and ground at the point 19.

A power source is connected from a terminal 20 through the line 21 and a resistor 22 to a circuit junction point 23, through a capacitor 24 to a circuit junction point 25, and through a diode 26 to a circuit junction point 27. The circuit junction point 27 is then connected to ground through a resistor 28 and to ground through a capacitor 29 and the pick-up means 10. It is apparent therefore that variations in impedance of the pick-up means 10 will cause a series of pulses to pass from the power source 20 through the diode 26 and capacitor 29 to ground at the junction point 19.

The timing means of this invention consists of two transistors 30 and 31 connected to form a bistable circuit. The transistor 30 has a collector 32 connected to the junction point 23 and an emitter 33 connected to ground at the junction point 34. Similarly, the transistor 31 has a collector 35 connected through a resistor 36 to the power line 21 and has an emitter 37 connected to the junction point 34 through a ground line 38.

The base 39 of the transistor 30 is connected to the collector 35 of the transistor 31 through a resistor 40. Also, the base 41 of the transistor 31 is connected to the collector 32 of the transistor 30 through a resistor 42. Both of the bases 39 and 41 of the respective transistors 30 and 31 are biased from the ground line 38 through resistors 43 and 44, respectively.

It is apparent from the connections described that if one of the transistors is turned "off," such as the transistor 31, its collector will be elevated in potential which in turn means that the base 39 will also be elevated in potential for turning "on" the transistor 30. Similarly, the turning "off" of the transistor 30 will raise the potential of the collector 32 and thereby raise the potential of the base 41 for turning "on" the transistor 31. Once one of the transistors is turned "on," a subsequent external pulse or signal must be applied to switch the operation to the other transistor.

The passing of the sprockets or teeth 17 in front of the detecting means 10 will generate negative pulses at the base 41 of the transistor 31 due to the presence of the diode 26. The negative pulses as applied to the base 41 will turn the transistor "off" and thereby raise the potential of the collector 35 for turning the transistor 30 "on." Accordingly, it may be said that the transistor 30 is normally "on" and the transistor 31 is normally "off" during the rotation of the sprocketed wheel 11.

The timing network 13 has a unijunction firing circuit which consists essentially of a unijunction transistor 46 having a gate terminal 47 and output terminals 48 and 49. The unijunction transistor 46 is connected to the power line 20 through a resistor 50 and has its terminal 49 connected directly to the ground line 38.

The gate 47 of the unijunction transistor 46 is connected to a circuit junction point 51 from a circuit branch which is in parallel with the transistor itself. The circuit junction point 51 is connected through a fixed resistor 52 and a variable resistor 53 having a pointer 54 to the power line 21. The circuit junction point 51 is also connected to a charging capacitor 55 and a fixed resistor 56 to a junction point 57 on the ground line 38. It is apparent from the orientation of the capacitor 55 with the unijunction transistor 46 that the charging of the capacitor 55 will generate a signal for firing the transistor 46.

It is to be noted that the gate 47 of the transistor 46 is also connected through a diode 58 to the collector 35 of the transistor 31.

Accordingly, when the transistor 31 is conducting, the capacitor 55 will not charge, as it is shorted out of the circuit through the transistor 31. However, when the transistor 31 is turned "off" the capacitor 55 is no longer shorted through the diode 58, and accordingly a charge will build up on the capacitor 55 until the firing potential of the transistor 46 is reached. Hence, the charging of the capacitor 55 can be used as a measuring means for establishing a fixed time interval.

In operation, therefore, a pulse generated at the revolving sprocketed wheel 11 results in the turning "off" of the transistor 31 and the turning "on" of the transistor 30. This generates a rise in potential at the collector 35 of the transistor 31 and prevents the discharge of the capacitor 55 through the transistor 31. A charge is then built up on the capacitor 55 from the power line 21 until a voltage is reached at which the unijunction transistor 46 is fired. The firing of the unijunction capacitor 46 then causes the capacitor 55 to discharge. The discharge signal from the capacitor 55 is picked up through a feedback line 59 and first and second diodes 60 and 61 to a circuit junction point 62 at the base 39 of the transistor 30. This negative signal, generated by the discharge of the capacitor 55, turns the transistor 30 "off," generates a rise in potential at the collector thereof and, accordingly, turns the transistor 31 "on." The turning "on" of the transistor 31 completes the discharge of the capacitor 55 and causes a lowering of the potential of a circuit point 63 which is connected directly to the collector 35 of the transistor 31.

This drop in potential at the circuit junction point 63 is coupled through the line 64 to a circuit junction point 65 and may be said to be the response signal of the time generating circuit 13.

As soon as the pulses begin to appear at the circuit junction point 18 due to the rotation of the wheel 11, these pulses are counted through the series of flip-flops, numbered 1, 2, 3, 4 and 5 in FIGURE 1. It will be apparent to those skilled in the art that after the sixteenth pulse appears at the input line 66 to the counting system 12, a single pulse will appear at the output line 67 of the counter. This output pulse is then fed through a line 68 to the "and" gate 14. Similarly, the output from the timer, which is taken from the junction point 65, is also fed through a line 69 to the "and" gate 14. As it will also be understood, the "and" gate generates an output pulse at a line 70 only when a signal appears simultaneously at both the lines 68 and 69 which may be said to be the inputs to the "and" gate.

It will be remembered that the junction point 65, which is connected directly to the junction point 63, which in turn is connected to the collector 35 of the transistor 31, will be elevated in potential during the entire time interval which is determined by the charging time of the capacitor 55. Accordingly, a positive potential will appear at the line 69 which is connected to one of the inputs of the "and" gate 14. Therefore, should a voltage pulse appear at the line 68, the "and" gate will be opened and a signal will be generated at the line 70 to trigger the flip-flop 15 and thereby set off an alarm 16.

However, the output of the transistor 31, as it appears at the junction point 65, is also connected through a circuit line 70 to a reset line 71 at a junction point 72. The reset line 71 is connected to each of the flip-flop networks, and a negative signal appearing at the reset line will cause the entire flip-flop network to be reset to a zero count position. Accordingly, if the capacitor 55 discharges and thereby generates a negative pulse at the circuit junction point 65 prior to the counting of sixteen pulses by the counter 12, the counter will be reset, and a pulse will be prevented from appearing at the output of the counter 67. Accordingly, no pulse will reach the "and" gate 14 through the line 68, and the "and" gate will not turn "on," and a signal will not appear at the line 70. Accordingly, no alarm will be generated under these conditions.

In contrast, if the wheel 11 is rotated faster than desired, the counter 12 will count sixteen pulses prior to the discharge of the capacitor 55 and will generate an output signal 67 which will coincide at the "and" gate 14 with the output of the timing network 13 prior to the turning "on" of the transistor 31. This means that the "and" gate 14 will be opened, and a signal will appear at the line 70 for triggering the flip-flop 15 and consequently the alarm 16. A reset button 73 is provided to reset the flip-flop at the one count position wherein one additional pulse appearing at the output of the "and" gate 14 will trigger the flip-flop and generate an output at the line 74 for triggering the alarm mechanism 16.

Figure 2:
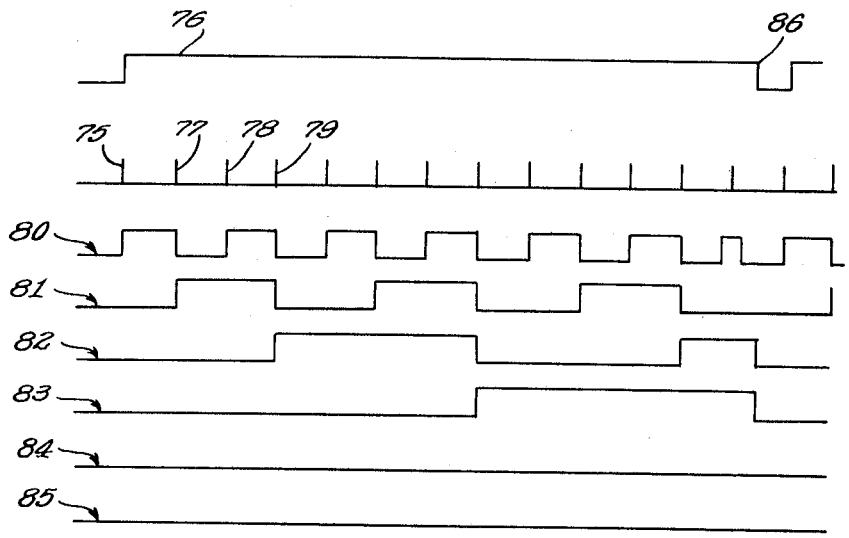
FIGURE 2 is a graphical illustration of a series of pulses which are derived from the circuit of FIGURE 1 when the speed of the object being sensed is below the maximum speed which would trigger an alarm system.
Figure 3:
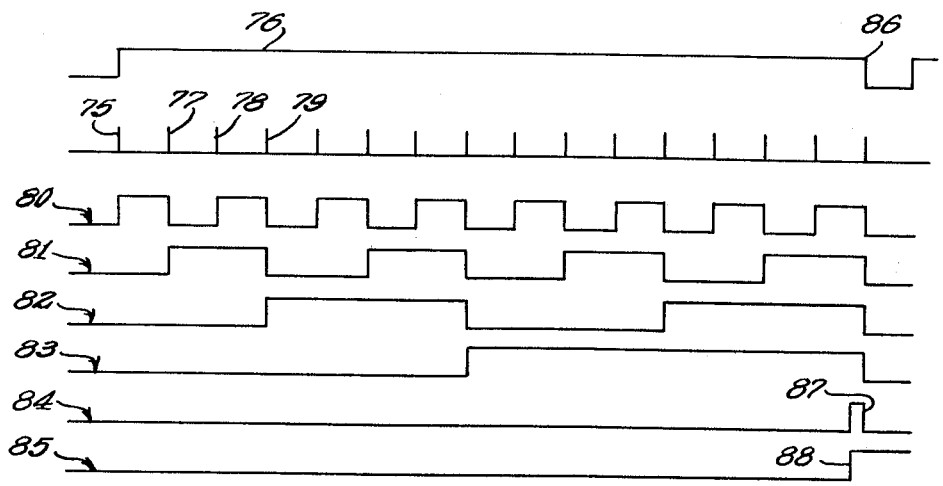
FIGURE 3 is a graphical illustration similar to FIGURE 2 showing the pulse detection applicable to the circuit of FIGURE 1 wherein the speed of the object being sensed exceeds the critical value for triggering an alarm system.

The functioning of the schematic diagram of FIGURE 1 is illustrated in FIGURES 2 and 3. In FIGURE 2, a first pulse 75 is generated by the detection means 10 and turns "off" the transistor 31 which causes a voltage waveform 76 to be developed at the collector 35 and hence at the circuit junction point 65. As explained, the signal 76 will continue to appear for the duration of the charging time of the capacitor 55.

The signal 76 is immediately applied to the "and" gate 14, and simultaneously, the counter 12 begins counting the pulses such as the pulses 77, 78, 79, etc.

As is well understood, the first flip-flop, generates output pulses illustrated by the graph 80, the second flip-flop generates pulses illustrated by the graph 81, the third flip-flop by the graph 82, the fourth flip-flop by the graph 83, and the fifth flip-flop by the graph 84. The graph 85 illustrates the signal generated at the output of the "and" gate or at the line 70.

For the situation illustrated in FIGURE 2, the capacitor 55 discharges at a point 86 prior to the appearance of a pulse on the graph 85. The discharge of the capacitor 55 generates a negative pulse at the reset line 71 for resetting the counter to a zero count position.

However, in FIGURE 3, by the time the capacitor discharges at the point 86, the counter has counted sixteen pulses, and, accordingly, a pulse appears at the output of the flip-flop as indicated by the pulse 87 on the graph 84. The presence of the pulse 87 during the same time interval as the signal 76 opens the "and" gate 14 and generates a signal 88 which is then utilized to trigger the alarm 16 through the operation of the flip-flop 15.

It is to be noted that FIGURES 2 and 3 are not on the same time scale, and that the duration of the signal 76 is constant for both examples and is determined by the charging time of the capacitor 55. The distinction in FIGURE 3 is that the wheel 11 is illustrated as rotating at a faster rate thereby generating a larger number of pulses within the fixed time interval of the signal 76. The duration of the signal 76, however, can be altered by varying the pointer 54 associated with the variable resistor 53 and thereby alter the charging time of the capacitor 55. However, as between these two examples, namely FIGURES 2 and 3, the charging time is held constant to illustrate the operation of the overspeed detection capability.

I claim:
1. An overspeed detection device comprising:
signal means for generating a fixed number of pulses per unit of displacement of an object being speed detected,
counting means for counting a number of pulses generated by said signal means,
first output means for generating a first response signal from said counting means when a given count is attained by said counting means,
timing means initiated by a pulse from said signal means and establishing a given time interval reference, second output means for generating a second response signal from said timing means at the termination of said given time interval reference,
means for generating a third response signal when said first response signal occurs prior in time to said second response signal at its inputs.
2. An overspeed detection device in accordance with claim 1 wherein said counting means comprises a digital counter having a number of series connected flip-flop stages and wherein said first response signal is generated by the triggering of the last of the series connected flip-flop stages.
3. An overspeed detection device in accordance with claim 2 wherein said series connected flip-flop stages are connected to the second output means and are thereby reset to a zero reading condition by the said second response signal from the timing means.
4. An overspeed detection device in accordance with claim 1 wherein said timing means produces a constant signal for the duration of the reference time interval and prior to the initiation of said second response signal and wherein an "and" gate is coupled to the output of the timing means and to the output of the counting means and wherein said "and" gate generates said third response signal only when both said constant signal and said first response signal occur simultaneously at the input of the "and" gate.
5. An overspeed detection device in accordance with claim 4 wherein signal means are provided to reset the timing means at the expiration of the reference time interval and wherein means are provided to utilize the resetting of the timing means to generate said second response signal for resetting the counting means.
6. An overspeed detection device in accordance with claim 1 wherein said signal means comprises a toothed wheel mounted to the rotating shaft of the object being speed detected and a transducer inductively coupled to the wheel to generate a pulse as each tooth of the toothed wheel passes by rotation into proximity with the transducer.
7. An overspeed detection device comprising:
signal means for generating a fixed number of pulses per unit of displacement of an object being speed detected,
counting means for counting a number of pulses generated by said signal means,
said counting means generating a first output signal after the count of a fixed number of pulses, timing means,
means for triggering the timing means with the first pulse detected by the counting means,
said timing means generating a reference time interval and having a constant output signal for the duration of the reference time interval thereof,
an "and" gate having the constant output signal and the first output signal coupled to the input thereof and generating a response signal only when said constant and first output signals occur simultaneously, and
said timing means having an automatic means for resetting both the timing means and the counting means at the expiration of the said reference time interval.
8. An overspeed detection device in accordance with claim 7 wherein said timing means comprises:
first and second transistors connected to form a bistable circuit,
said first transistor being normally "on" and said second transistor being normally "off,"
said second transistor having an output terminal coupled to said "and" gate, and to said counter means,
capacitance means coupled to said output terminal and to a power source and being chargeable when said second transistor is "off,"
firing means coupled to said capacitance means and discharging the same when the charge thereon reaches a specified level,
the discharge of said capacitance means generating a signal at said output terminal of the second transistor for resetting said counter means.
9. An overspeed detection device in accordance with claim 8 wherein said output terminal of said second transistor has a constant output signal thereon for the duration of the charging time of said capacitance means and wherein the discharge of said capacitance means is coupled to said first transistor to turn "off" the same and turn "on" the second transistor thereby removing the constant signal at said output terminal.
10. An overspeed detection device in accordance with claim 8 wherein a diode is connected between said capacitance means and said output terminal of said second transistor to dischagre the capacitor through the transistor after the transistor has been turned "on" and wherein the automatic resetting signal is generated at the cathode side of the diode at said output terminal in response to the turning "on" of said second transistor.

11. An overspeed detection device comprising:
means for generating a series of pulses indicative of the displacement of an object being speed detected,
first signal means for developing a first output prior to the elapse of a period of time from a given start time,
second signal means for developing a second output after a given number of pulses from the pulse generating means have elapsed from a given start time,
means to synchronize the start time of the first and second signal means, and
means to generate a response signal when both said first and second signals occur simultaneously at its inputs.

References Cited

UNITED STATES PATENTS 3,282,099 11/1966 Kingman -------- 340—271 X
3,413,449 11/1968 Brown.

JOHN W. CALDWELL, Primary Examiner

PERRY PALAS, Assistant Examiner

U.S. Cl. X.R.

324—68; 328—74, 75; 340—271